(12) United States Patent
Al-Shibli

(10) Patent No.: US 10,962,250 B2
(45) Date of Patent: Mar. 30, 2021

(54) SMART DESERT GEOTHERMAL HEAT PUMP FOR AIR CONDITIONING AND DOMESTIC WATER COOLING

(71) Applicant: ABU DHABI POLYTECHNIC, Abu Dhabi (AE)

(72) Inventor: Murad Al-Shibli, Al-Ain (AE)

(73) Assignee: ABU DHABI POLYTECHNIC, Abu Dhabi (AE)

( * ) Notice: Subject to any disclaimer, the term of this patent is extended or adjusted under 35 U.S.C. 154(b) by 0 days.

(21) Appl. No.: 16/846,230

(22) Filed: Apr. 10, 2020

(65) Prior Publication Data

US 2020/0240664 A1    Jul. 30, 2020

Related U.S. Application Data

(63) Continuation-in-part of application No. 16/590,357, filed on Oct. 1, 2019, now abandoned.

(Continued)

(51) Int. Cl.
*F24F 11/46* (2018.01)
*F24F 5/00* (2006.01)
(Continued)

(52) U.S. Cl.
CPC ............ *F24F 11/46* (2018.01); *F24F 5/0046* (2013.01); *F24F 5/0096* (2013.01); *F24F 11/64* (2018.01);
(Continued)

(58) Field of Classification Search
CPC .......... F24F 11/46; F24F 5/0096; F24F 11/67; F24F 5/0046; F24F 11/64; F24F 2221/54;
(Continued)

(56) References Cited

U.S. PATENT DOCUMENTS

| 5,253,482 A | 10/1993 | Murway |
| 10,436,488 B2 | 10/2019 | Zugibe et al. |

(Continued)

FOREIGN PATENT DOCUMENTS

EP    3239626 A1    11/2017

OTHER PUBLICATIONS

Kumar et al., "Heating and cooling potential of an earth-to-air heat exchanger using artificial neural network." Renewable Energy 31.8 (2006): 1139-1155.

(Continued)

*Primary Examiner* — Charles R Kasenge
(74) *Attorney, Agent, or Firm* — Nath, Goldberg & Meyer; Richard C. Litman

(57) ABSTRACT

The smart desert geothermal heat pump for air conditioning and domestic water cooling includes a heat pump having heat exchange piping adapted for installation underground in desert sand adjacent a structure to be heated/cooled. The heat pump draws heat from the sand to heat air in the structure in a heating cycle and draws heat from the structure to sink in the ground in a cooling cycle to cool the structure. A processor has an artificial intelligence machine learning unit configured to store historical weather data and mean heat pump on/off times by calendar date in Big Data tall arrays, and periodically re-computes mean heat pump on/off times by calendar date. A controller connected to the processor and at least one switch on the heat pump automatically switches between heating and cooling cycles and turns the pump on and off according to the median re-computed heat pump on/off times.

2 Claims, 6 Drawing Sheets

Related U.S. Application Data

(60) Provisional application No. 62/739,361, filed on Oct. 1, 2018.

(51) Int. Cl.
   *F25B 30/06* (2006.01)
   *F24F 11/64* (2018.01)
   *F24F 11/67* (2018.01)
   *G05B 19/042* (2006.01)
   *F24F 110/10* (2018.01)
   *F24F 130/10* (2018.01)
   *F24F 140/60* (2018.01)

(52) U.S. Cl.
   CPC ............ *F24F 11/67* (2018.01); *F25B 30/06* (2013.01); *G05B 19/042* (2013.01); *F24F 2005/0057* (2013.01); *F24F 2110/10* (2018.01); *F24F 2130/10* (2018.01); *F24F 2140/60* (2018.01); *F24F 2221/54* (2013.01); *G05B 2219/2614* (2013.01)

(58) Field of Classification Search
   CPC ............ F24F 2130/10; F24F 2110/10; F24F 2005/0057; F24F 2140/60; G05B 19/042; G05B 2219/2614; F25B 30/06
   See application file for complete search history.

(56) References Cited

U.S. PATENT DOCUMENTS

| | | | |
|---|---|---|---|
| 2013/0213069 A1* | 8/2013 | Elliott | F24D 17/001 62/213 |
| 2017/0211829 A1* | 7/2017 | Slack | F24D 12/00 |
| 2017/0211862 A1* | 7/2017 | Slack | F25B 49/02 |
| 2019/0137134 A1* | 5/2019 | Koop | F24F 11/63 |

OTHER PUBLICATIONS

Salque et al., "Development of a Neural Network-based Building Model and Application to Geothermal Heat Pumps Predictive Control." SIMUL 2012: The Fourth International Conference on Advances in System Simulation. 2012.

Kecebas et al., "Thermal monitoring and optimization of geothermal district heating systems using artificial neural network: A case study." Energy and Buildings 50 (2012): 339-346.

Kecebas et al., "Artificial neural network modeling of geothermal district heating system thought exergy analysis." Energy Conversion and Management 64 (2012): 206-212.

Yabanova et al., "Development of ANN model for geothermal district heating system and a novel PID-based control strategy." Applied Thermal Engineering 51.1-2 (2013): 908-916.

Farghally et al., "Control methodologies based on geothermal recirculating aquaculture system." Energy 78 (2014): 826-833.

Tordoff, "Big Data and Tall Arrays," Matlab Expo 2016.

Moradi et al., "A comprehensive approach to find the performance map of a heat pump using experiment and soft computing methods." Energy Conversion and Management, 153, (2017)224-242.

* cited by examiner

SMART DESERT GEOTHERMAL HEAT PUMP FOR AIR CONDITIONING AND DOMESTIC WATER COOLING

CROSS-REFERENCE TO RELATED APPLICATION

This application is a continuation-in-part of U.S. patent application Ser. No. 16/590,357, filed on Oct. 1, 2019, which claims the benefit of U.S. Provisional Patent Application No. 62/739,361, filed on Oct. 1, 2018, each of which is hereby incorporated by reference in its entirety.

BACKGROUND

1. Field

The disclosure of the present patent application relates to heat pumps, and particularly to a smart desert geothermal heat pump for air conditioning and domestic water cooling having a processor configured with an artificial intelligence machine learning unit for implementing an artificially intelligent control method for a geothermal heat pump for optimizing shut-off hours of the geothermal heat pump.

2. Description of the Related Art

FIGS. 2A and 2B illustrate the operation of a conventional geothermal heat pump 100 for heating or cooling an exemplary house H. It should be understood that house H is shown for exemplary and illustrative purposes only. In FIG. 2A, ground loops 102 are shown buried in the ground G beneath house H. The ground loops are filled with a heat exchange medium F, which absorbs heat from the ground G (in the winter) or releases heat back into the ground G (in the summer), allowing the geothermal heat pump 100 to be operated in a heating cycle (in the winter) or in a cooling cycle (in the summer). In FIG. 2B, for purposes of simplification and illustration, 104 represents the inlet for media F exiting the ground loops 102 and entering the main cycle portion of the geothermal heat pump 100, and 106 represents an outlet for media F exiting the main cycle portion of the geothermal heat pump 100 and feeding back into the ground loops 102.

In the heating cycle, in which media F transfers heat from the ground into the main cycle portion of the geothermal heat pump 100, heat is transferred from media F into a refrigerant R in an evaporator 106. The refrigerant R flows through a reversing valve 108 and into a compressor 110, which increases the pressure on the refrigerant R to raise its temperature. The reversing valve 108 may be switched to change direction of the refrigerant flow, allowing the geothermal heat pump 100 to either be operated in the illustrated heating cycle, or in a cooling cycle.

The refrigerant R exits the compressor 110 and flows through a desuperheater 112, which transfers some of the excess heat of refrigerant R into water W flowing through a hot water heater 114. The refrigerant R then flows back through the reversing valve 108 for diversion to the internal heating (or cooling) unit of house H, which is illustrated here as a conventional fan 116 and vent 118, which transfers heat from the refrigerant R into the ambient air to produce a blown stream of heated air HA. In the reverse cycle, cooled refrigerant R would be used to produce a cool stream of blown air.

Following this heat exchange, the refrigerant R then flows through expansion valve 120, which lowers the pressure and temperature of refrigerant R as it flows back to evaporator 106 to restart the cycle. Although geothermal heat pumps are generally considered to be far more energy efficient than conventional heating and cooling systems, optimizing the overall efficiency of the geothermal heat pump is difficult, since it depends on a variety of environmental factors which constantly change throughout the year, such as average ground illumination by the sun and/or average ground temperature on a particular day of the year. Since keeping track of years of data related to air temperature, ground temperature (or sand temperature in desert regions) and solar radiation measurements, recorded by day, week, month and year would be extremely difficult for a typical household user of a geothermal heat pump, it would obviously be desirable to be able to apply "big data" techniques associated with artificial intelligence and machine learning to the problem of optimizing shut-off hours for the geothermal heat pump. Thus, a smart desert geothermal heat pump for air conditioning and domestic water cooling solving the aforementioned problems is desired.

SUMMARY

The smart desert geothermal heat pump for air conditioning and domestic water cooling has a processor configured with an artificial intelligence machine learning unit for implementing a method of controlling a geothermal heat pump for optimizing shut-off hours of geothermal heat pumps. Historical environmental data is stored in a first array in computer readable memory, where the historic environmental data includes at least dates and corresponding average temperatures therefor. Typically, the historic environmental data will contain a much larger set of parameters relevant to the optimization of power expenditure of geothermal heat pumps, such as, but not limited to, ground temperatures, air temperatures, humidity values, air pressures, solar irradiance values, etc. Since such historical environmental data will result in massive array sizes, desired parameters are then selected from the historical environmental data. For example, just the average temperatures and corresponding dates may be selected. Then, a smaller subset of data is retrieved from the first array based on just these selected desired parameters, and a second array is generated from the subset of data. The second array, for example, may be stored in the form of a "tall array", allowing it to be manipulated using the "tall array" functions associated with Matlab®, provided by The Mathworks Inc. Corporation. The second array is stored in the computer readable memory.

Big data artificial intelligence is used to model power expenditure of a modeled geothermal heat pump using at least a portion of the second array as a training data set. A remaining portion of the second array can be used as a validation set for validating the model. Optimal shut-off hours corresponding to optimized power expenditure values of the modeled geothermal heat pump are then determined for the selected desired parameters. The optimal shut-off hours for the selected desired parameters are stored in a third array. The third array is stored in the computer readable memory. The third array may then be scaled up to a size matching the size of the first array to generate a lookup table, which contains optimized shut-off hours corresponding to stored sets of environmental parameters. Real-time environmental parameters in a region corresponding to a physical geothermal heat pump are then determined, and these real-time environmental parameters are compared with the stored sets of environmental parameters in the lookup table to obtain a real-time optimized value of shut-off hours. The physical geothermal heat pump has a controller that turns the pump on and off based on the real-time optimized value of shut-off hours.

These and other features, of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

The smart desert geothermal heat pump for air conditioning and domestic water cooling includes a heat pump having heat exchange piping adapted for installation underground in desert sand adjacent a structure to be heated/cooled. The heat pump draws heat from the sand to heat air in the structure in a heating cycle and draws heat from the structure to sink in the ground in a cooling cycle to cool the structure. A processor has an artificial intelligence machine learning unit configured to store historical weather data and mean heat pump on/off times by calendar date in Big Data tall arrays, and periodically re-computes mean heat pump on/off times by calendar date. A controller connected to the processor and at least one switch on the heat pump automatically switches between heating and cooling cycles and turns the pump on and off according to the median re-computed heat pump on/off times.

Figure 1:
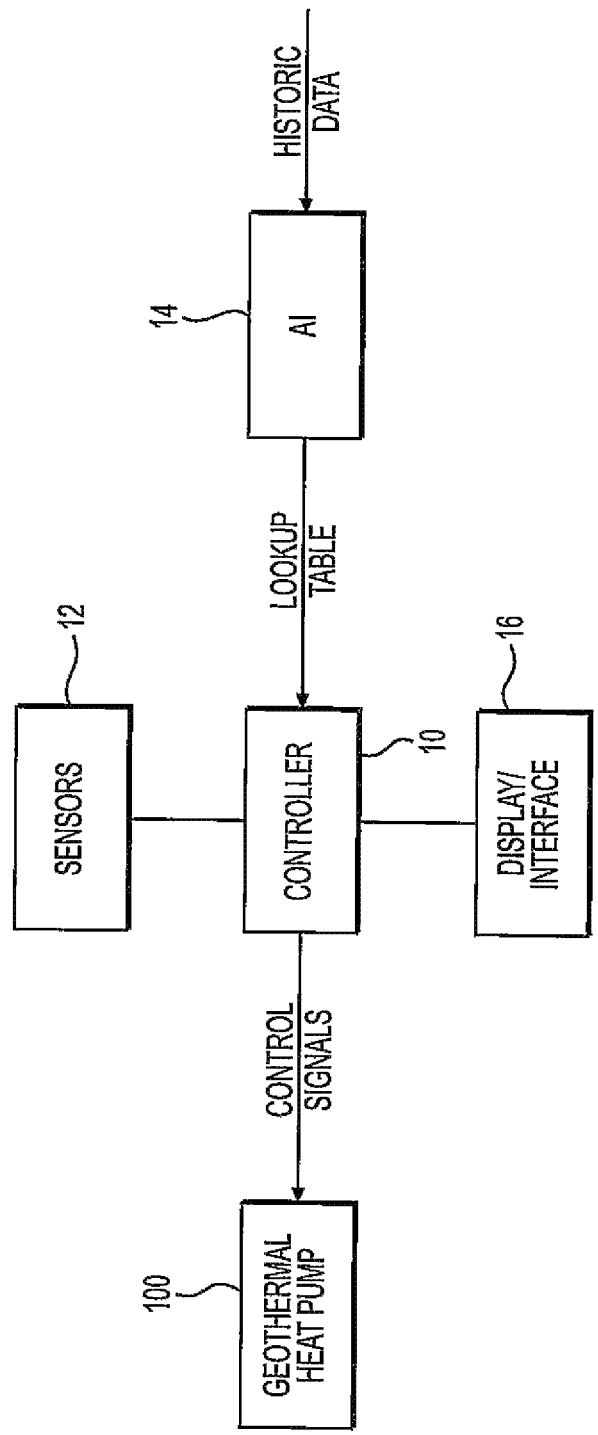
FIG. 1 is a block diagram of a smart desert geothermal heat pump for air conditioning and domestic water cooling.
Figure 2A:
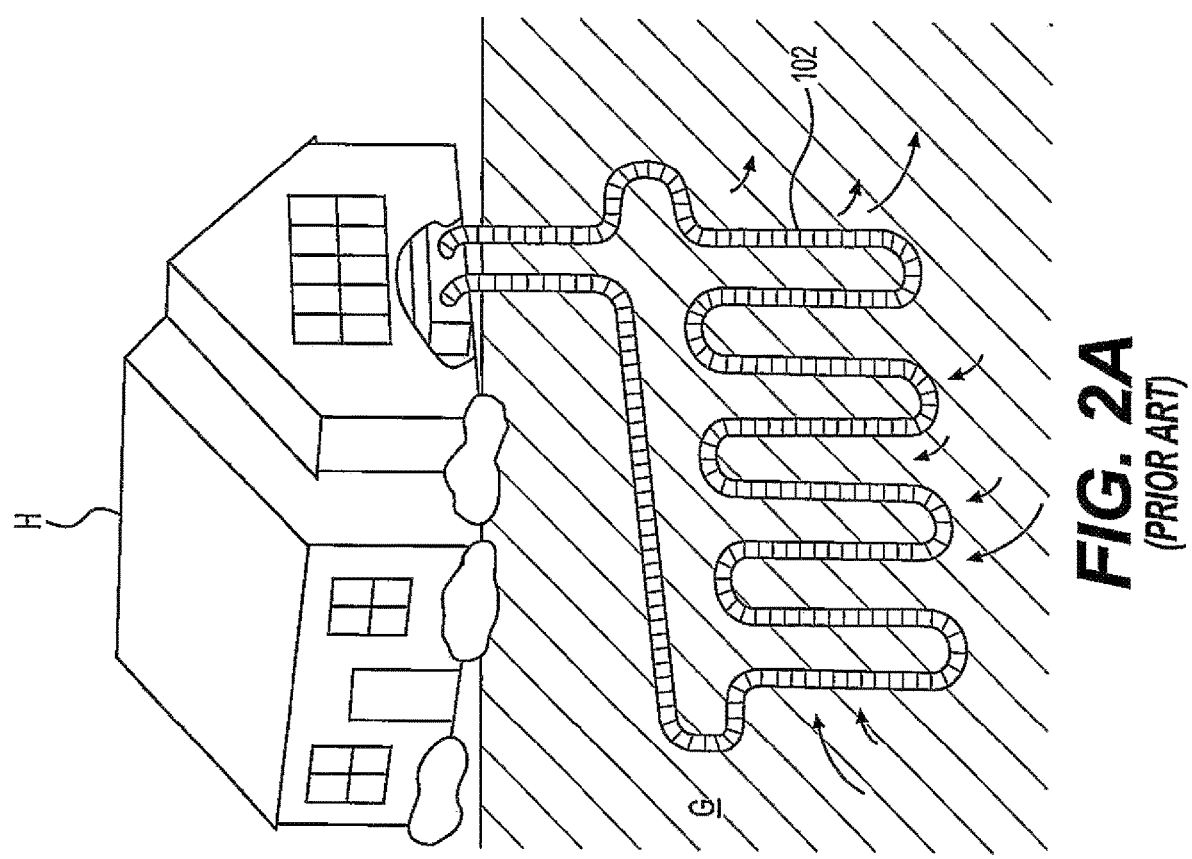
FIG. 2A is a diagram of underground positioning of ground loops associated with a conventional prior art geothermal heat pump.
Figure 2B:
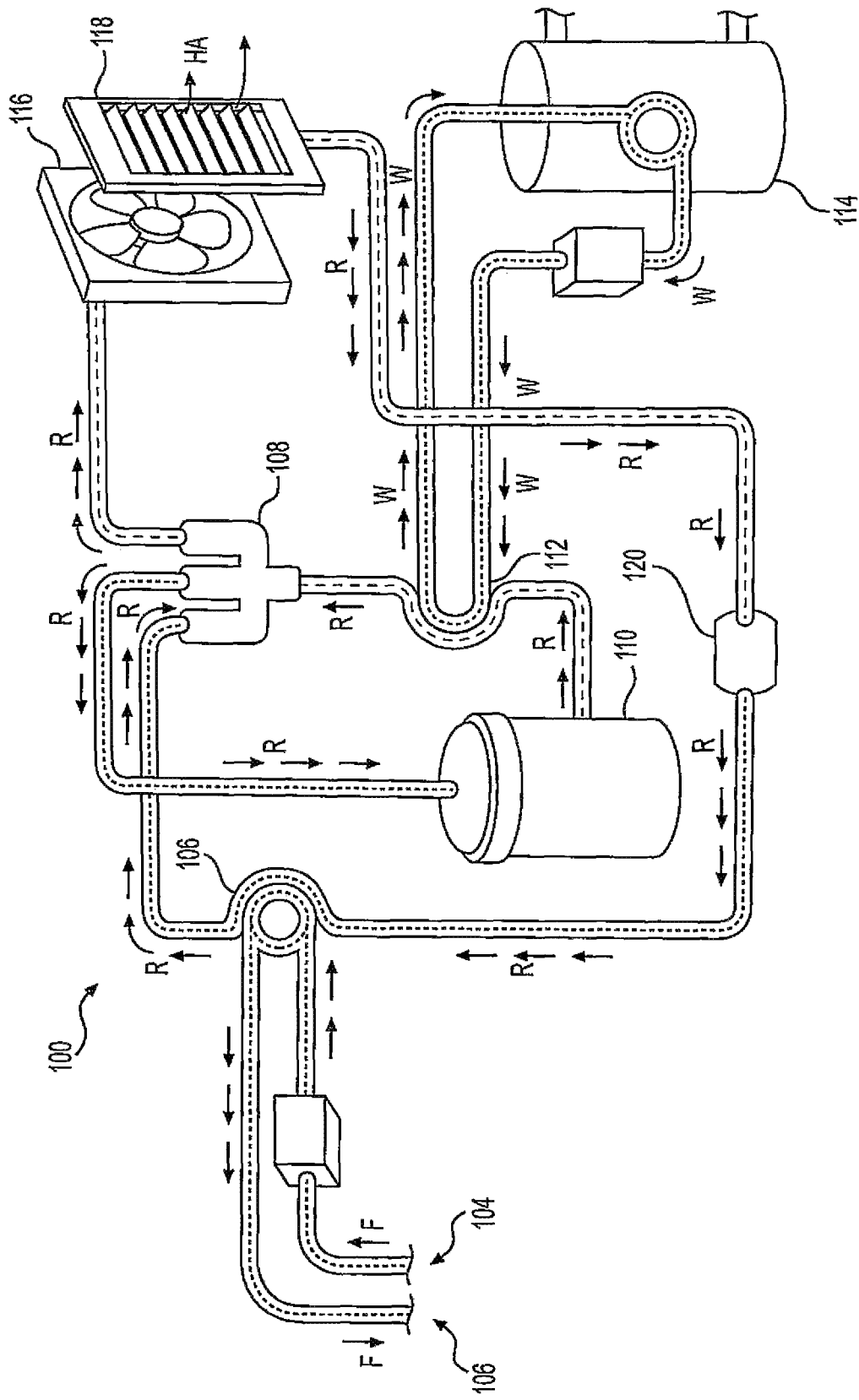
FIG. 2B is a diagram showing the circulation of heat exchange media through the conventional prior art geothermal heat pump of FIG. 2A.

A method of controlling a geothermal heat pump is an artificially intelligent control method for optimizing shut-off hours of geothermal heat pumps. Historic environmental data is stored in a first array in computer readable memory associated with controller 10 of FIG. 1, where the historic environmental data includes at least dates and corresponding average temperatures therefor. Typically, the historic environmental data will contain a much larger set of parameters relevant to the optimization of power expenditure of geothermal heat pumps, such as, but not limited to, ground temperatures, air temperatures, humidity values, air pressures, solar irradiance values, etc. Since such historic environmental data will result in massive array sizes, desired parameters are then selected from the historic environmental data. As a non-limiting example, just the average temperatures and corresponding dates may be selected. Then, a smaller subset of data is retrieved from the first array based on just these selected desired parameters, and a second array is generated from the subset of data. The second array, as a non-limiting example, may be stored in the form of a "tall array", allowing it to be manipulated using the "tall array" functions associated with Matlab®, provided by The Mathworks Inc. Corporation. The second array is stored in the computer readable memory.

Once the second array has been stored, additional calculations may be performed thereon, particularly for purposes of data modeling, as will be described in greater detail below. For example, the particular parameter variables of interest may be identified at this stage for purposes of calculating the corresponding matrix size. This can be performed as a check routine to validate the efficiency of out-of-memory calculations. The purpose of forming the second array is for ease of calculations, and non-selected parameter variable-related operations can be deferred. In the example given above, just the average temperatures and corresponding dates were selected from the original set of historic environmental data. In order to further decrease the size of the array, selected dates from the entire time span contained in the historic environmental data can be chosen. It should be understood that additional selections of data may be made, creating sub-arrays of even smaller sizes.

Big data artificial intelligence (AI) is used to model power expenditure of a modeled geothermal heat pump using at least a portion of the second array as a training data set. A remaining portion of the second array can be used as a validation set for validating the model. Optimal shut-off hours corresponding to optimized power expenditure values of the modeled geothermal heat pump are then determined for the selected desired parameters. The optimal shut-off hours for the selected desired parameters are stored in a third array. The third array is stored in the computer readable memory. It should be understood that AI 14 may be any suitable type of machine learning process using any suitable type of neural networks or the like.

Figure 3:
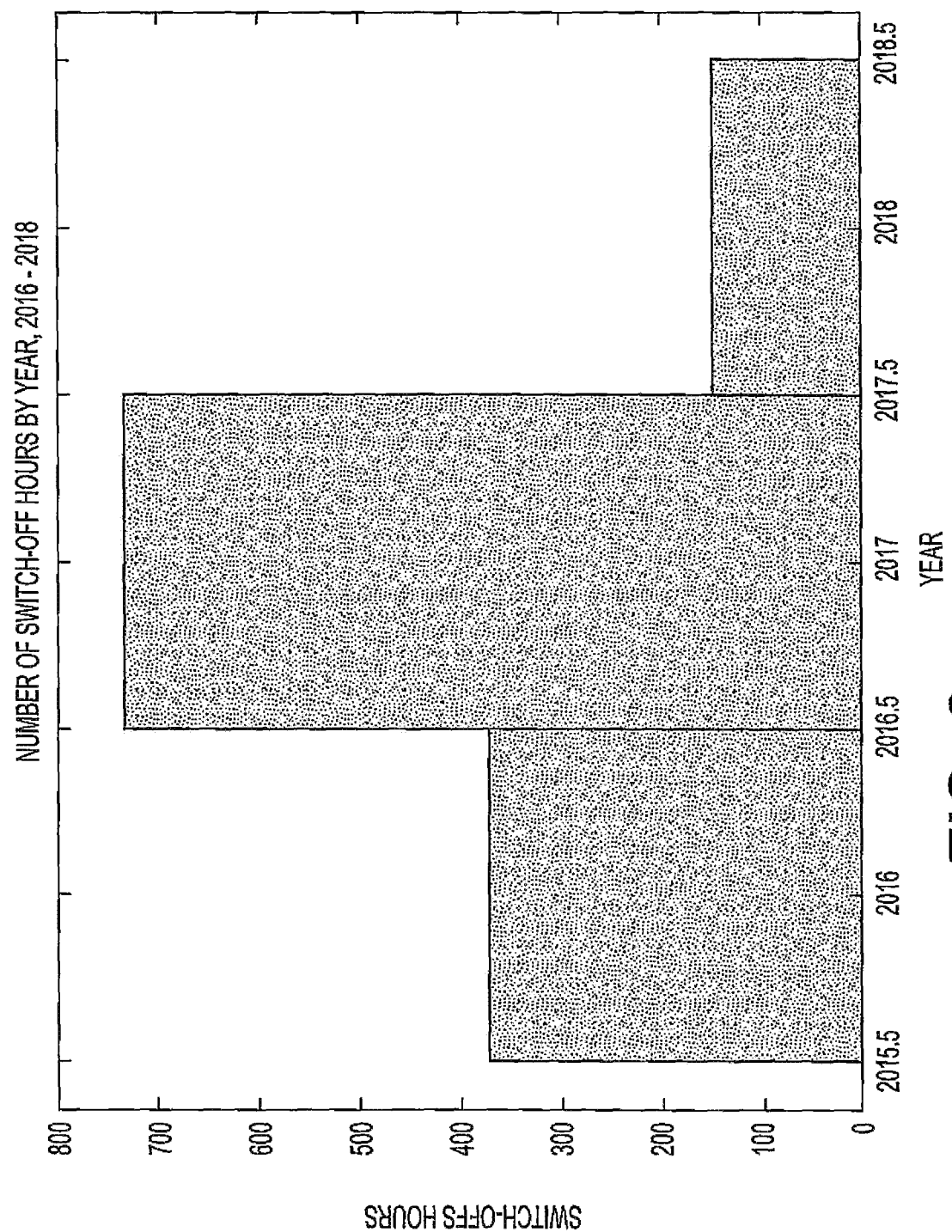
FIG. 3 is an exemplary chart showing modeled optimal shut-off hours generated by a method of controlling a geothermal heat pump, broken down by semi-annual periods.

For purposes of monitoring and geothermal heat pump operation, the optimal shut-off hours may be presented graphically to the user on display/interface 16. In the non-limiting example of FIG. 3, an exemplary graphical chart is generated for the user, showing the generated optimal shut-off hours presented for semi-annual periods (between 2015 and 2018 in the example of FIG. 3).

The third array may then be scaled up to a size matching the size of the first array to generate a lookup table, which contains optimized shut-off hours corresponding to stored sets of environmental parameters. Real-time environmental parameters in a region corresponding to a physical geothermal heat pump are then determined, and these real-time environmental parameters are compared with the stored sets of environmental parameters in the lookup table to obtain a real-time optimized value of shut-off hours. The real-time environmental parameters may be measured by local sensors 12, or may be retrieved from a weather service or the like. The physical geothermal heat pump is then turned on and off based on the real-time optimized value of shut-off hours. It should be understood that the physical geothermal heat pump may be any suitable type of geothermal heat pump, such as geothermal heat pump 100 described above.

Figure 4:
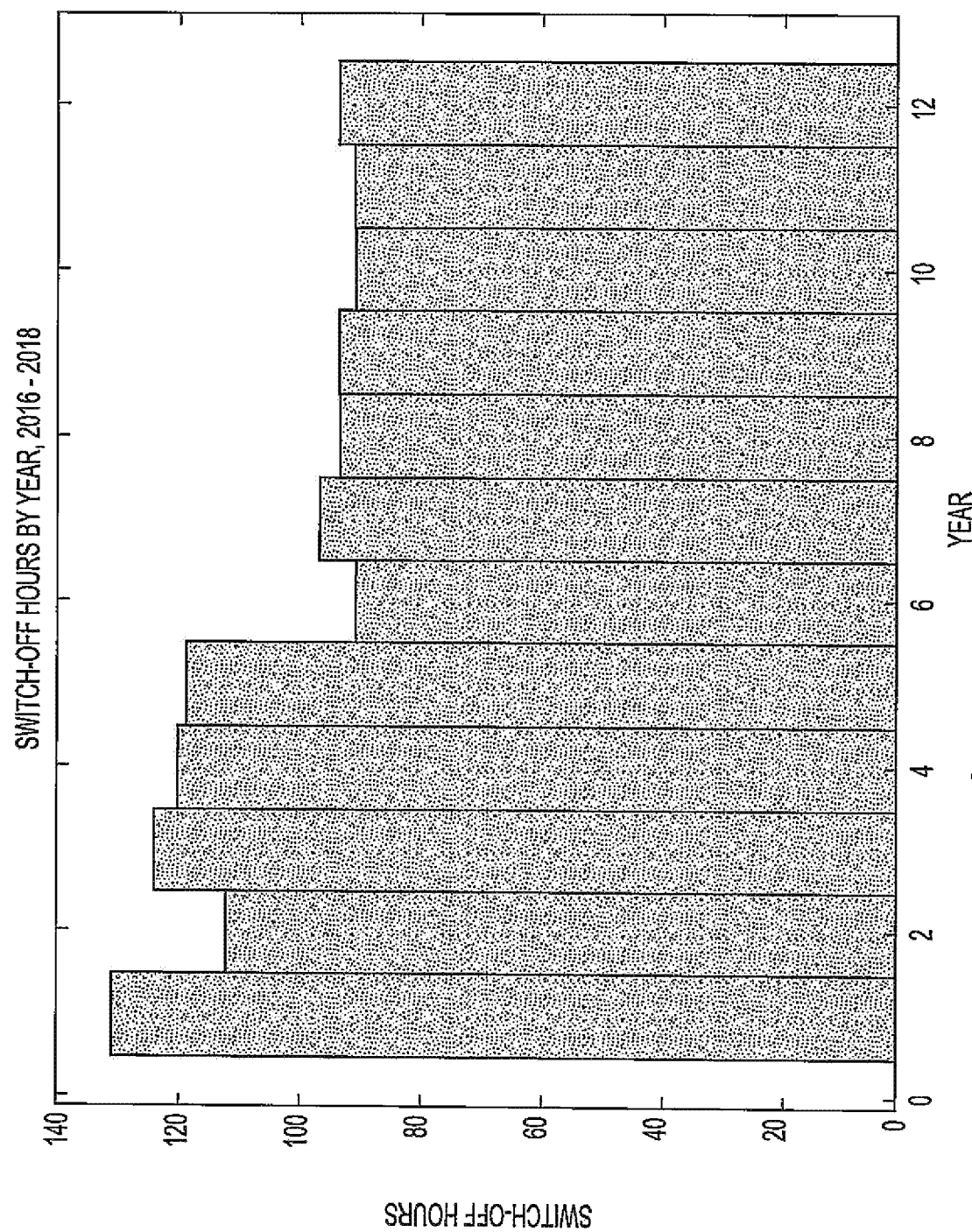
FIG. 4 is an exemplary chart showing modeled optimal shut-off hours generated by the method of controlling a geothermal heat pump, broken down by months.
Figure 5:
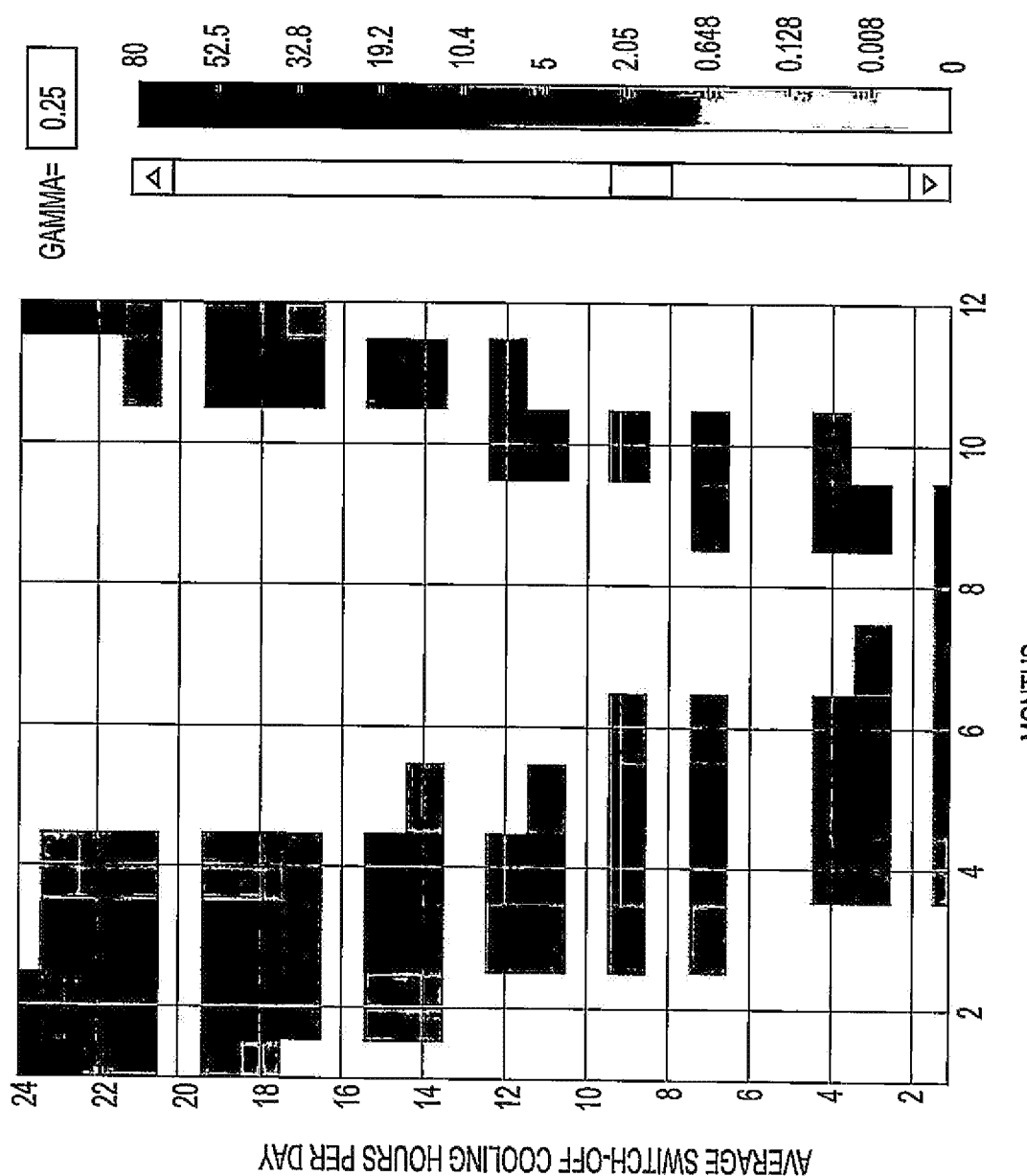
FIG. 5 is an exemplary histogram showing modeled optimal shut-off hours generated by the method of controlling a geothermal heat pump, broken down by months.

The scaling up process, combined with the machine learning, also allows greater granularity to be added to the predicted shut-off hours. For example, as noted above, FIG. 3 represents the optimal shut-off hours presented graphically to the user, broken down for semi-annual periods. In FIG. 4, the data has been scaled and is now broken down by month. FIG. 5 is an exemplary histogram broken down even further, showing average shut-off hours per day.

The modeling of the power expenditure of the modeled geothermal heat pump may be based on the mass balance equation for geothermal heat pumps, which is given by:

$$\dot{m}_{in} - \dot{m}_{out} = \frac{dm_{sys}}{dt} = 0, \quad (1)$$

where $\dot{m}_{in}$ is the inlet mass flow rate, $\dot{m}_{out}$ is the outlet mass flow rate, and $$\frac{dm_{sys}}{dt}$$

represents the time rate of change of mass accumulated in the system. The general energy balance can be formulated as:

$$\dot{E}_{in} - \dot{E}_{out} = \frac{dE_{sys}}{dt} = 0, \quad (2)$$

where $\dot{E}_{in}$ is the inlet energy flow rate, $\dot{E}_{out}$ is the outlet, energy flow rate, and $$\frac{dE_{sys}}{dt}$$

represents the time rate of change of energy in the system.

The general energy balance can be specified more explicitly as:

$$(\dot{Q}_{in} - \dot{Q}_{out}) + (\dot{m}_{in} h_{in} - \dot{m}_{out} h_{out}) = (\dot{W}_{out} - \dot{W}_{in}), \quad (3)$$

where $\dot{Q}_{in}$ is the rate of heat input, $\dot{Q}_{out}$ is the rate of heat output, $\dot{W}_{out}$ is the rate of work output, $\dot{W}_{in}$ is the rate of work input, and $h_{in}$ is the input enthalpy per unit mass, and $h_{out}$ is the output enthalpy per unit mass. The rate form of the balance of entropy is given by:

$$\dot{S}_{in} - \dot{S}_{out} + \dot{S}_{gen} = \frac{dS_{sys}}{dt} = 0, \quad (4)$$

where $\dot{S}_{in}$ is the rate of entropy input, $\dot{S}_{out}$ is the rate of entropy output, $\dot{S}_{gen}$ is the general entropy rate, and $$\frac{dS_{sys}}{dt}$$

is the time rate of change of entropy in the system. The rates of entropy transfer by heat transferred at a rate of $\dot{Q}_i$ and mass flowing at a rate of $\dot{m}$ are given by $$\dot{S}_{heat} = \frac{\dot{Q}_i}{T_i}$$

and $\dot{S}_{mass} = \dot{m}s$, respectively, where $T_i$ is the temperature. The latter can be modified as:

$$\dot{S}_{gen} = \dot{m}_{out} s_{out} - \dot{m}_{in} s_{in} - \frac{\dot{Q}_i}{T}. \quad (5)$$

Moreover, the general exergy balance can be expressed in rate form as:

$$\dot{X}_{in} - \dot{X}_{out} + \dot{X}_{destroyed} = \frac{dX_{sys}}{dt} = 0, \quad (6)$$

where $\dot{X}_{in}$ is the rate of general energy input, $\dot{X}_{out}$ is the rate of general energy output, $\dot{X}_{destroyed}$ is the rate of general energy lost in the system, and $$\frac{dX_{sys}}{dt}$$

is the time rate of change of general energy in the system. The rate form of the general exergy balance can also be written as $$\left(1 - \frac{T_0}{T}\right)(\dot{Q}_{in} - \dot{Q}_{out}) - (\dot{W}_{out} - \dot{W}_{in}) + (\dot{m}_{in} \varphi_{in} - \dot{m}_{out} \varphi_{out}) = \dot{X}_{destroyed},$$

where $\varphi = (h - h_0) - T_0(s - s_0)$ is defined as the flow (specific) exergy.

The irreversibility I is given by the following equation:

$$\dot{I} = T_0 \dot{S}_{gen}. \quad (7)$$

Furthermore, the coefficient of performance of energy of the geothermal heat pump unit itself, $COP_{heat-pump}$, and that of the whole system, $COP_{sys}$, can be determined, respectively, as $$COP_{heat-pump} = \frac{\dot{Q}_{shl}}{\dot{W}_{comp}} \text{ and } COP_{sys} = \frac{\dot{Q}_{shl}}{\dot{W}_{input}},$$

where $\dot{Q}_{shl}$ is the space heating load, $\dot{W}_{comp}$ is the work input to the compressor and $\dot{W}_{input}$ is the total work input rate to the system.

It is to be understood that the smart desert geothermal heat pump for air conditioning and domestic water cooling is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A smart desert geothermal heat pump for air conditioning and domestic water cooling, comprising:
    a geothermal heat pump system having:
        a system of piping adapted for installation underground in a desert sand area adjacent a structure to be heated and cooled by the smart desert geothermal heat pump;
        a heat pump having at least one switch configured for switching the pump between heating and cooling cycles and for turning the pump on and off;

a heat exchange medium flowing between the pump and the system of piping;

an air duct system installed in the structure to be heated and cooled by the smart desert geothermal heat pump; and heat exchange tubing extending between the heat pump and the air duct system, the heat exchange medium flowing in the tubing, the pump being configured for pumping heat from the desert sand to the air duct system by heat exchange in the heating cycle to heat the structure in winter and to pump heat from the structure to the underground piping to transfer the heat to the desert sand in the cooling cycle in summer; and a processing system having a machine learning artificial intelligence unit configured for storing historical data relating to temperatures and heat pump on/off switching time by calendar date in Big Data tall arrays, and for re-computing median on/off heat pump times for calendar dates from samples of data in the tall arrays, the processing system having a controller connected to the at least one heat pump switch, the controller being configured to switch the heat pump between heating and cooling cycles and to switch the heat pump on and off automatically according to the re-computed median on/off heat pump times for calendar dates.

2. A method of controlling a geothermal heat pump, comprising the steps of:

storing historic environmental data in a first array in computer readable memory, the historic environmental data including at least dates and corresponding average temperatures therefor;

selecting desired parameters from the historic environmental data;

retrieving a subset of data from the first array based on the selected desired parameters and generating a second array from the subset of data, the second array being stored in the computer readable, memory;

modeling power expenditure of a modeled geothermal heat pump using at least a portion of the second array as a training data set;

determining optimal shut-off hours corresponding to optimized power expenditure values of the modeled geothermal heat pump for the selected desired parameters;

storing the optimal shut-off hours for the selected desired parameters in a third array, the third array being stored in the computer readable memory;

scaling the third array to a size matching a size of the first array to generate a lookup table containing optimized shut-off hours corresponding to stored sets of environmental parameters;

determining real-time environmental parameters in a region corresponding to a physical geothermal heat pump;

comparing the real-time environmental parameters with the stored sets of environmental parameters in the lookup table to obtain a real-time optimized value of shut-off hours; and selectively turning the physical geothermal heat pump on and off based on the real-time optimized value of shut-off hours.

\* \* \* \* \*